(12) United States Patent
Devasigamony et al.

(10) Patent No.: US 11,656,773 B2
(45) Date of Patent: May 23, 2023

(54) AUTOMATIC MANAGEMENT OF FILE SYSTEM CAPACITY USING PREDICTIVE ANALYTICS FOR A STORAGE SYSTEM

(71) Applicant: EMC IP Holding Company LLC, Hopkinton, MA (US)

(72) Inventors: Davidson Devasigamony, Boxborough, MA (US); Deepak Kamath Neerebailur, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/860,749

(22) Filed: Apr. 28, 2020

(65) Prior Publication Data
US 2021/0334021 A1 Oct. 28, 2021

(51) Int. Cl.
*G06F 12/00* (2006.01)
*G06F 13/00* (2006.01)
*G06F 3/06* (2006.01)

(52) U.S. Cl.
CPC ............ *G06F 3/0631* (2013.01); *G06F 3/067* (2013.01); *G06F 3/0616* (2013.01); *G06F 3/0643* (2013.01); *G06F 3/0647* (2013.01); *G06F 3/0653* (2013.01); *G06F 3/0683* (2013.01)

(58) Field of Classification Search
CPC .... G06F 3/0631; G06F 3/0616; G06F 3/0643; G06F 3/0647; G06F 3/0653; G06F 3/067; G06F 3/0683
USPC ......................................................... 711/154
See application file for complete search history.

(56) References Cited

U.S. PATENT DOCUMENTS

| | | | | |
|---|---|---|---|---|
| 4,709,367 A * | 11/1987 | Grate | .................... | G06F 3/0601 |
| | | | | 360/60 |
| 5,953,729 A * | 9/1999 | Cabrera | .................. | G06F 16/10 |
| 8,589,617 B2 * | 11/2013 | Maeda | .................. | G06F 3/0643 |
| | | | | 711/103 |
| 8,886,911 B2 * | 11/2014 | Nemazie | ............. | G06F 12/0871 |
| | | | | 711/171 |
| 9,646,256 B2 * | 5/2017 | Chamness | .............. | G06Q 30/02 |
| 10,535,011 B2 * | 1/2020 | Cohen | .................. | G06F 3/0653 |
| 10,656,869 B1 * | 5/2020 | Greenwood | .......... | G06F 3/0647 |

(Continued)

OTHER PUBLICATIONS

QNAP Systems, Inc., Threshold Warning; Howto Disable Threshold Warning from Volume Management, http://qnapsupport.net/threshold-warning-how-to-disable-threshold-warning-from-volume-managment/, Oct. 3, 2019, 8 pages.

(Continued)

*Primary Examiner* — Sheng Jen Tsai
(74) *Attorney, Agent, or Firm* — Ryan, Mason & Lewis, LLP

(57) ABSTRACT

An apparatus comprises at least one processing device comprising a processor coupled to a memory. The at least one processing device is configured to obtain input data representing information characterizing a storage capacity associated with a file system of a given storage system. The at least one processing device is also configured to predict a change to the storage capacity of the file system of the given storage system based on at least a portion of the obtained input data. The at least one processing device is further configured to cause the storage capacity of the file system of the given storage system to change based on a result of the prediction.

17 Claims, 6 Drawing Sheets

---

300

302 — OBTAIN INPUT DATA REPRESENTING INFORMATION CHARACTERIZING A STORAGE CAPACITY ASSOCIATED WITH A FILE SYSTEM OF A GIVEN STORAGE SYSTEM

304 — PREDICT A CHANGE TO THE STORAGE CAPACITY OF THE FILE SYSTEM OF THE GIVEN STORAGE SYSTEM BASED ON AT LEAST A PORTION OF THE OBTAINED INPUT DATA

306 — CAUSE THE STORAGE CAPACITY OF THE FILE SYSTEM OF THE GIVEN STORAGE SYSTEM TO CHANGE BASED ON A RESULT OF THE PREDICTION

(56) References Cited

U.S. PATENT DOCUMENTS

| | | | | |
|---|---|---|---|---|
| 10,810,054 | B1* | 10/2020 | Martinez Lerin | G06F 3/067 |
| 2004/0078376 | A1* | 4/2004 | Kusama | G06F 11/323 |
| | | | | 714/E11.181 |
| 2006/0282637 | A1* | 12/2006 | Yamauchi | G06F 3/0644 |
| | | | | 711/170 |
| 2008/0082726 | A1* | 4/2008 | Elhamias | G06F 12/0646 |
| | | | | 711/103 |
| 2009/0083511 | A1* | 3/2009 | Kanda | G06F 3/067 |
| | | | | 711/173 |
| 2009/0272099 | A1* | 11/2009 | Garimella | F01N 3/208 |
| | | | | 60/277 |
| 2009/0282088 | A1* | 11/2009 | Thomas | G06F 16/1727 |
| 2010/0042629 | A1* | 2/2010 | Fukatani | G06F 11/2289 |
| | | | | 709/212 |
| 2010/0211620 | A1* | 8/2010 | Matsuzawa | G06F 12/0223 |
| | | | | 707/822 |
| 2012/0017567 | A1* | 1/2012 | Geveci | F01N 13/0093 |
| | | | | 60/274 |
| 2012/0150764 | A1* | 6/2012 | Sadegh | G06Q 10/067 |
| | | | | 705/348 |
| 2012/0151120 | A1* | 6/2012 | Post | G06F 12/0246 |
| | | | | 711/103 |
| 2012/0221611 | A1* | 8/2012 | Watanabe | G06F 3/0671 |
| | | | | 707/827 |
| 2013/0179648 | A1* | 7/2013 | Yagame | G06F 3/0604 |
| | | | | 711/156 |
| 2014/0047208 | A1* | 2/2014 | Morse | G06F 3/0605 |
| | | | | 711/E12.078 |
| 2015/0293815 | A1* | 10/2015 | Harel | G06F 11/3034 |
| | | | | 707/649 |
| 2016/0173603 | A1* | 6/2016 | Ainscow | H04L 67/1097 |
| | | | | 707/827 |
| 2016/0246812 | A1* | 8/2016 | Barajas Gonzalez | |
| | | | | G06F 3/0641 |
| 2017/0060769 | A1* | 3/2017 | Wires | H04L 12/6418 |
| 2017/0160957 | A1* | 6/2017 | Thangaraj | G06F 3/064 |
| 2017/0160976 | A1* | 6/2017 | Thangaraj | G06F 3/0604 |
| 2017/0374147 | A1* | 12/2017 | McNair | H04L 41/0896 |
| 2018/0150224 | A1 | 5/2018 | You | |
| 2018/0262413 | A1* | 9/2018 | Sureka | H04L 43/16 |
| 2019/0056877 | A1* | 2/2019 | Kolesnik | G06F 9/5072 |
| 2019/0073297 | A1* | 3/2019 | Goss | G06F 3/0679 |
| 2019/0155698 | A1* | 5/2019 | Shekhar | G06F 11/1451 |
| 2019/0294333 | A1* | 9/2019 | Zaidman | G06F 3/0652 |
| 2019/0332486 | A1* | 10/2019 | Aseev | G06F 16/182 |
| 2020/0012443 | A1* | 1/2020 | Chen | G06F 3/0629 |
| 2020/0379670 | A1* | 12/2020 | Zheng | G06F 3/0673 |
| 2020/0409588 | A1* | 12/2020 | Zaidman | G06F 3/0679 |
| 2021/0011830 | A1* | 1/2021 | Khokhar | G06F 9/45533 |

OTHER PUBLICATIONS

U.S. Appl. No. 16/876,323 filed in the name of Shashidhar R. Kulkarni et al., filed May 18, 2020, and entitled "Automated Storage Capacity Provisioning Using Machine Learning Techniques.".

Dell EMC, "Dell EMC Unity: Introduction to the Platform," Technical White Paper, Dec. 2019, 25 pages.

Dell Technologies, "Dell EMC Unity: Best Practices Guide," Technical White Paper, Mar. 2020, 26 pages.

Dell EMC, "CloudIQ Detailed Review: A Proactive Monitoring and Analytics Application for Dell EMC Storage Systems," Technical White Paper, Jun. 2019, 63 pages.

* cited by examiner

AUTOMATIC MANAGEMENT OF FILE SYSTEM CAPACITY USING PREDICTIVE ANALYTICS FOR A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for TO operations. A storage controller typically operates in accordance with a file system. A file system is one or more software programs implemented in a storage system for organizing and retrieving data stored in the storage system. For example, data is stored in a file format (files) and accessible using file names and/or addresses. Data may be stored in other formats. As amounts of data increase or decrease in a storage system, it is sometimes necessary to, respectively, increase the storage capacity (i.e., allocate more storage array capacity) or decrease the storage capacity (i.e., allocate less storage array capacity) associated with the file system.

SUMMARY

Illustrative embodiments of the present disclosure provide techniques for automatic management of file system capacity in a storage system using predictive analytics.

In one embodiment, an apparatus comprises at least one processing device comprising a processor coupled to a memory. The at least one processing device is configured to obtain input data representing information characterizing a storage capacity associated with a file system of a given storage system. The at least one processing device is also configured to predict a change to the storage capacity of the file system of the given storage system based on at least a portion of the obtained input data. The at least one processing device is further configured to cause the storage capacity of the file system of the given storage system to change based on a result of the prediction.

These and other illustrative embodiments include, without limitation, methods, apparatus, networks, systems and processor-readable storage media.

DETAILED DESCRIPTION

Figure 1:
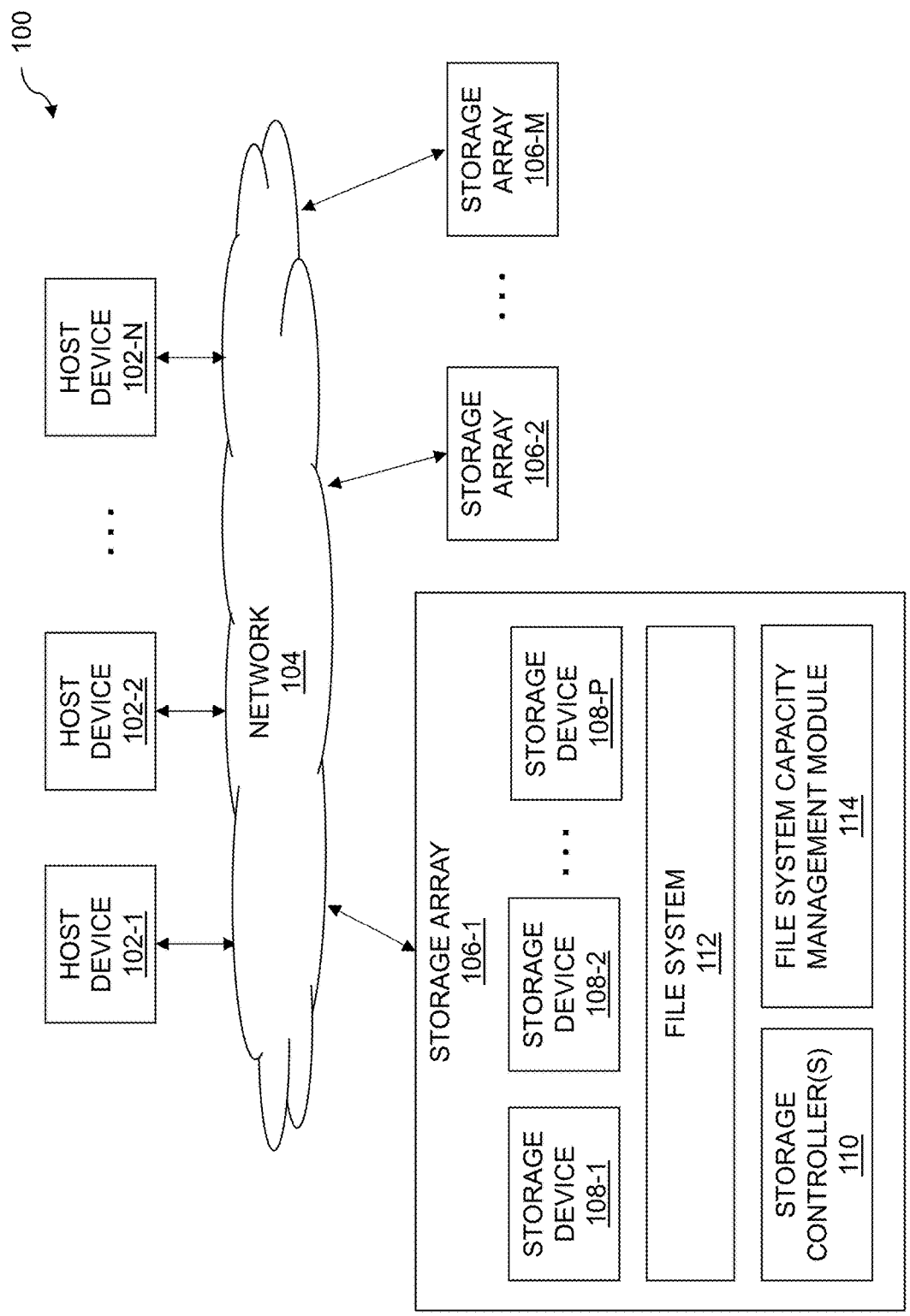
FIG. 1 is a block diagram of an information processing system configured with functionalities for automatically managing file system capacity using predictive analytics in accordance with an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As mentioned above in the background section, it is sometimes necessary to increase (i.e., extend, expand, or the like) or decrease (i.e., shrink, reduce, or the like) the storage capacity associated with a file system of a given storage system. Currently, some storage systems provide auto-extend/auto-shrink ("auto" referring to automatic) functionality with respect to the file system based on water marks, e.g., a high water mark (HWM) for auto-extend and a low water mark (LWM) for auto-shrink. For example, assume the HWM is set to 90% which represents the percentage of used storage capacity at which the file system should be auto-extended (meaning that there is currently only 10% free storage capacity left). Once a file system reaches its HWM, it is auto-extended, until the size of the free capacity drives the used capacity below the HWM again. Given the explanation of the HWM-based auto-extend function, operation of the auto-shrink function using an LWM is realized in a straightforward manner (i.e., when used capacity falls below the LWM, the file system capacity is reduced).

There are several scenarios that illustrate limitations with the existing water mark-based approach:

(i) Assume the HWM is set to cause an auto-extend (by 20% of current capacity) upon reaching 90% of the total capacity of the file system. Further, assume the file system is currently at 86% used and the capacity usage grows by 5% only at the beginning of every quarter (once every three months). As soon as the quarter begins, assume the used capacity reaches 91% (thus, used capacity is over HWM) and the file system is automatically increased (auto-extended) by 20%. Thus, even though the actual capacity need only increases by 5% for a given quarter, the auto-extend increases capacity by 20% thereby wasting 15% of unused capacity for three months.

(ii) Assume that the HWM and the LWM are set at values irrespective of the file system size. For a large file system, the remaining 10% (after the HWM is reached) could be several gigabytes (GBs) or even terabytes (TBs) of free space. Smaller file systems can be, for example, on the order of megabytes (MBs). So HWM/LWM are fixed for all file systems irrespective of whether they are extremely large or extremely small.

(iii) Assume that the HWM is set to auto-extend upon reaching 90% of the total capacity of the file system, and that there is a single large file that needs to be stored that is over 10% of total capacity. Then, even before it reaches the HWM and auto-extend occurs, the file system will be full.

Illustrative embodiments overcome the above and other limitations of existing auto-extend/auto-shrink functionalities by providing intelligent file system capacity management using predictive analytics (one or more predictive analytic algorithms). More particularly, illustrative embodiments accurately predict the growth of a file system based on one or more of seasonality data and historical trending data of the file system. "Seasonality data" as illustratively used herein is data that reflects regular and predictable changes in some attribute being analyzed (in this case, file system capacity) that recur every calendar year. "Historical trending data" as illustratively used herein is data that reflects upward or downward shifts in some attribute being analyzed (in this case, file system capacity) that occur over a time period. Seasonality data and historical trending data, alone or in combination, can be illustratively referred to herein as "predictive input data" since such data is used as input data to one or more predictive analytic algorithms. It is realized herein that such predictive functionality would not only help auto-extend or auto-shrink the file system at the appropriate time instance but also help decide the appropriate auto-extend or auto-shrink size. Thus, with respect to the three scenarios above:

(i) Illustrative embodiments using predictive analytics rather than the HWM would have considered the seasonality data and historical trending data and would auto-extend intelligently with the appropriate required size rather than simply allocating a fixed percentage or absolute value with no regard to the fact that the next growth would not occur until after a quarter.

(ii) Illustrative embodiments using predictive analytics would manage the file system capacity based on the size of the file system and the actual free space available on the file system.

(iii) Illustrative embodiments using predictive analytics would account for larger sized files and extend the file system capacity ahead of time as appropriate.

An illustrative embodiment of an information processing system within which file system capacity management using predictive analytics is implemented will be described below in the context of FIG. 1. However, it is to be understood that the architecture of FIG. 1 is intended to be an example and that file system capacity management using predictive analytics can be implemented in other appropriate architectures in alternative embodiments.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe). Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

In some embodiments, at least one of the storage arrays 106 illustratively comprises one or more VNX®, VMAX®, Unity™ or PowerMax™ storage arrays, as well as other commercially available storage arrays from Dell EMC of Hopkinton, Mass.

As another example, one or both of the storage arrays 106 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 10 and 11.

The storage array 106-1 also comprises a file system 112 that is used to organize and retrieve data stored in the storage devices 108. While it is called a file system, it is to be understood that data can be stored in accordance with file system 112 in various formats including, but not limited to, files, blocks, objects, etc. Further, while file system 112 is shown as a separate block in storage array 106-1, it is to be appreciated that all or part of the file system 112 can be implemented as part of the storage controllers 110 and/or storage devices 108.

The storage array 106-1 implements a file system capacity management module 114 configured to perform intelligent auto-extend/auto-shrink functionalities using predictive analytics with respect to the file system 112. Although not explicitly shown in FIG. 1 for clarity of illustration, it is assumed in some embodiments that other ones of the storage arrays 106-2 through 106-M implement respective additional instances of a file system and/or a file system capacity management module, as well as respective sets of storage devices and storage controllers in a manner similar to that described herein with respect to storage array 106-1. Further, although shown in FIG. 1 as being external to the storage controllers 110 and storage devices 108 of storage array 106-1, in other embodiments the file system capacity management module 114 may be implemented at least partially within one or more of the storage controllers 110 and/or storage devices 108. For example, at least one of the storage controllers 110 may be implemented as a virtual storage controller running on an embedded hypervisor of the storage array 106-1. The file system capacity management module 114 may be part of such a virtual storage controller, or may be run separate from the virtual storage controller on such an embedded hypervisor. Various other arrangements are possible, including where at least a portion of the functionalities of the file system capacity management module 114 is implemented external to the storage array 106-1 (e.g., on one or more of the host devices 102, on a separate server, on a cloud computing infrastructure, etc.). Further, in alternative embodiments, a single file system 112 may be used to organize and retrieve data from storage devices 108 on all or a subset of storage arrays 106-1, 106-2, ..., 106-M, and a single file system capacity management module 114 may be used to manage file system capacity across all or a subset of storage arrays 106-1, 106-2, ..., 106-M.

At least portions of the functionalities of the file system capacity management module 114 may be implemented at least in part in the form of software that is stored in memory and executed by a processor.

It is to be understood that the particular set of elements shown in FIG. 1 for file system capacity management using predictive analytics is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2A:
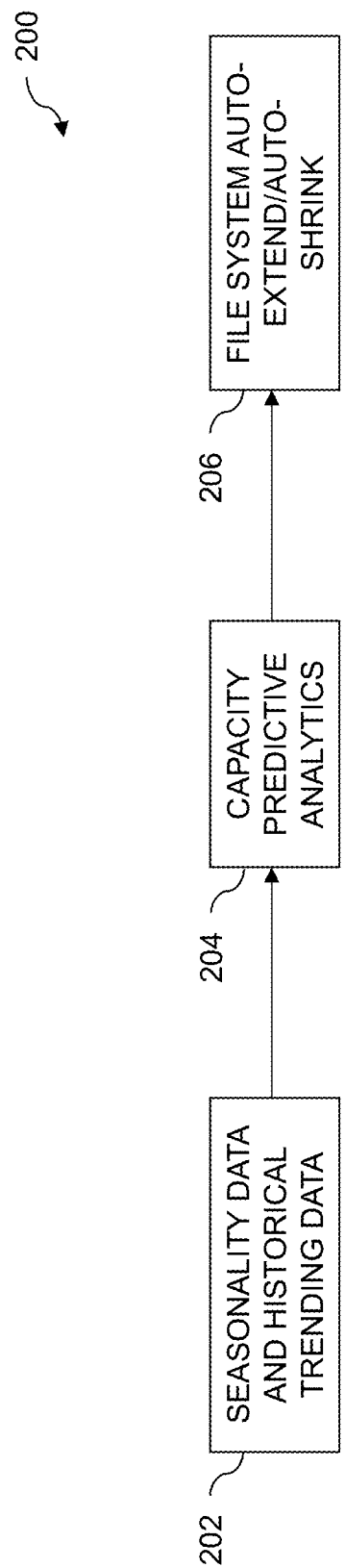
FIGS. 2A and 2B are diagrams of an exemplary process for use in a file system capacity management module in accordance with an illustrative embodiment.
Figure 2B:
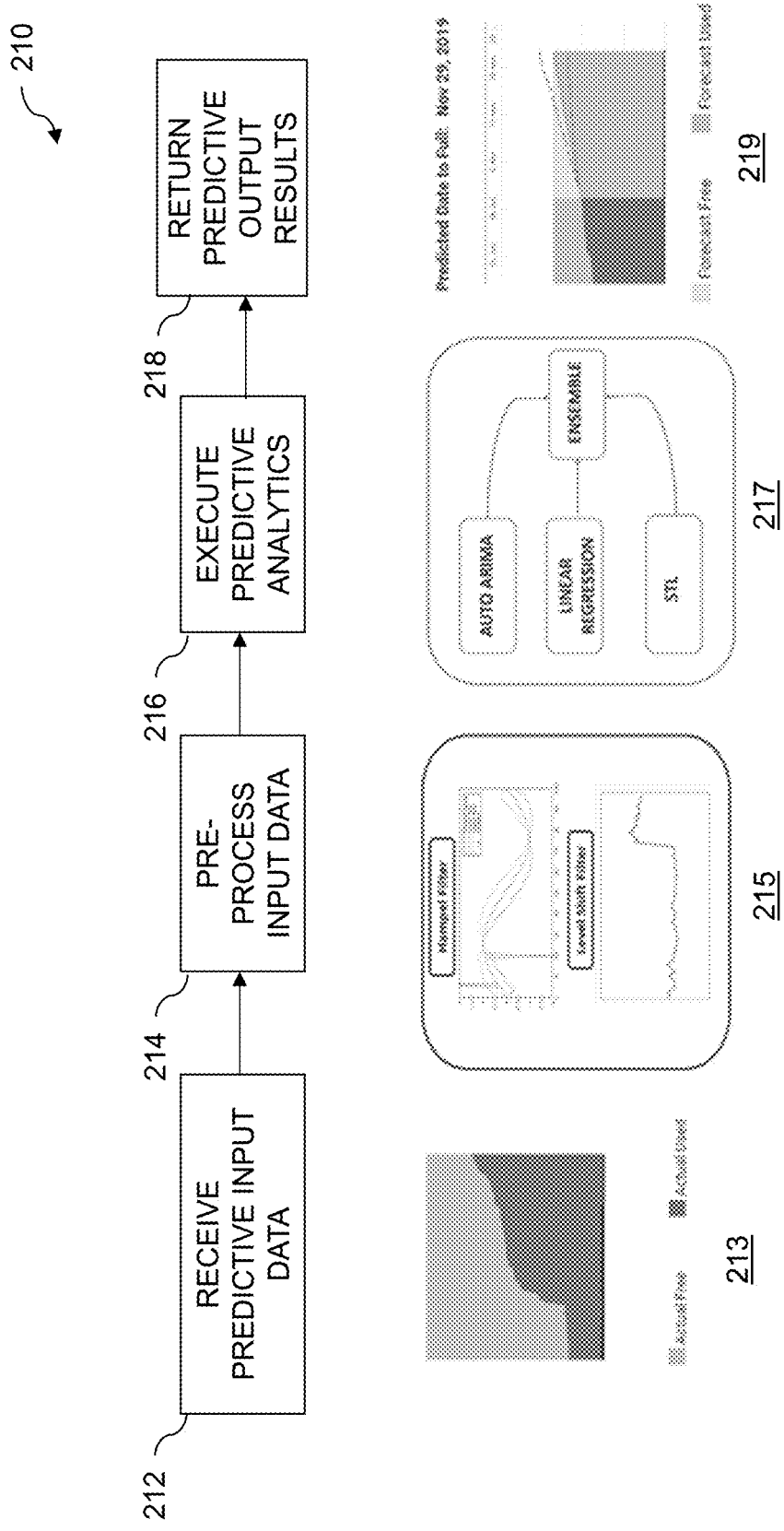

FIGS. 2A and 2B are diagrams of an exemplary process for use in a file system capacity management module in accordance with an illustrative embodiment. For example, the exemplary process illustrated in FIGS. 2A and 2B may be implemented by file system capacity management module 114 in FIG. 1 to perform auto-extend and auto-shrink operations on file system 112 (i.e., manage file system capacity). It is to be understood that this particular process in FIGS. 2A and 2B is only an example, and that additional or alternative processes for file system capacity management in a storage system may be used in other embodiments.

As will be further explained, illustrative embodiments perform predictive analytics on seasonality data and historical trending data for a given file system. The predictive analytics accurately predict the capacity growth of the file system and identify the appropriate time instance and capacity amount to auto-extend or auto-shrink the file system.

More particularly, FIG. 2A shows process 200 which comprises, at step 202, receiving seasonality data and historical trending data for a given file system. For example, in some embodiments in the context of FIG. 1, seasonality data and historical trending data (predictive input data) is collected for the file system 112 by the storage controllers 110, and then obtained by file system capacity management module 114. Step 204 executes one or more predictive analytic algorithms (predictive analytics). For example, in some embodiments in the context of FIG. 1, module 114 performs the predictive analytics. Step 206 uses results of step 204 to cause the file system capacity to be increased (auto-extend) or reduced (auto-shrink) at the appropriate time and appropriate capacity amount. The appropriate time and amount are determined based on the predictive input data as will be further explained below. For example, in some embodiments in the context of FIG. 1, module 114 instructs the storage controllers 110 to increase or decrease the storage capacity of the file system 112. The one or more storage controllers 110 can then allocate or de-allocate storage space on one or more storage devices 108 of one or more storage arrays 106.

With respect to auto-extend, benefits of using predictive analytics include, but are not limited to:

(i) The auto-extend operation is exercised based on one or more predictive analytic algorithms and not based on reaching a certain capacity level of the file system and, hence, even before reaching certain capacity levels, the file system can be auto-extended.

(ii) The auto-extend operation now considers the seasonality and historic trending of the file system over a given time period, e.g., past two years, as part of analytics-prediction.

(iii) The auto-extend operation now considers the total size of the file system (e.g., large file system in TBs or small file system in MBs) instead of a fixed percentage-based used capacity to auto-extend (since the percentage free could be several TBs for a very large file system).

(iv) Using the predictive analytics, embodiments are able to arrive at the optimal file system growth size that is required.

While benefits above are mentioned from the perspective of an auto-extend operation, similar and other benefits are realized in a straightforward manner as well from the perspective of an auto-shrink operation.

One example of predictive analytics that can be used for managing the capacity of a storage array in step 204 of FIG. 2A is illustrated in process 210 of FIG. 2B. As shown, step 212 receives predictive input data for use in the predictive analytics. As mentioned, the data is seasonality data and historic trending data over a time period of, for example, two years collected at 24-hour intervals. The input data is pre-processed in step 214. Pre-processing can include, for example, applying one or more data filters to interpolate missing data and smooth any spikes in the data. In step 216, one or more predictive analytic algorithms are executed on the pre-processed data, and predictive output results are returned in step 218.

In one embodiment, an ensemble of a seasonal and trend decomposition model with locally estimated scatterplot smoothing (LOESS) or STL model with one or more forecasting algorithms in the form of an auto-regressive integrated moving average (ARIMA) model and a linear regression model is used for predictive analytics. In one embodiment, the ensemble uses two years of predictive input data at 24-hour intervals. Missing data is interpolated and spikes in the data are smoothed using a Hampel filter and a level shift filter. A Hampel filter serves to normalize data if there is a spike present in the data associated with the attribute (i.e., file system capacity) being predictively analyzed, and a level shift filter normalizes the data if there is an abrupt step up/down in the attribute.

Shown in FIG. 2B, below the steps of process 210, is an example of file system capacity forecasting and how it is applicable for auto-extend in accordance with an illustrative embodiment. Graph 213 shows file system capacity usage over time. The dark grey shows the capacity usage and the light grey shows the maximum capacity. Block 215 illustrates operation of the Hampel and level shift filters. Block 217 illustrates the predictive analytics using a multi-model ensemble as mentioned above. In graph 219, the area shown with the lighter shade is what the capacity predictive analytic algorithm(s) is predicting the capacity usage will look like going forward. The dashed lines shown are the upper and lower bounds for the prediction which represent confidence that, based on previous history, future usage values should fall within these bounds. By applying such capacity predictive analytic algorithm(s) in a storage array, the results of the algorithm(s) are used to determine automatic expansion (auto-extend) or automatic reduction (auto-shrink) of a file system.

By way of example only, in some embodiments, CloudIQ™ from Dell EMC of Hopkinton, Mass. can be used to perform some or all of the predictive analytics operations in the process of FIGS. 2A and 2B. However, other analytics can be used in alternative embodiments.

Figure 3:
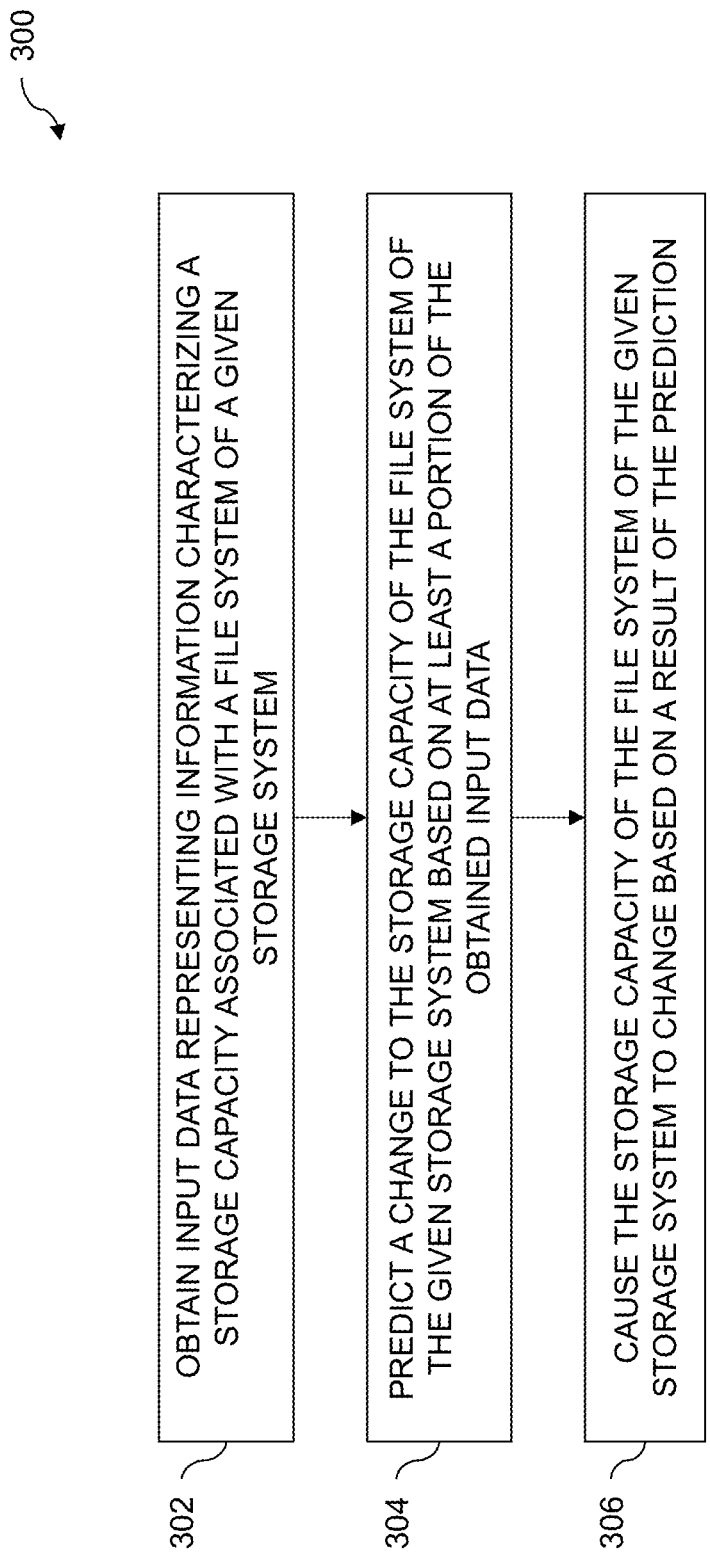
FIG. 3 is a flow diagram of an exemplary process for managing file system capacity in a storage system using predictive analytics in accordance with an illustrative embodiment.

FIG. 3 is a flow diagram of an exemplary process 300 for managing file system capacity in a storage system using predictive analytics in accordance with an illustrative embodiment. As shown, step 302 obtains input data representing information characterizing a storage capacity associated with a file system of a given storage system. Further, step 304 predicts a change to the storage capacity of the file system of the given storage system based on at least a portion of the obtained input data. Still further, step 306 causes the storage capacity of the file system of the given storage system to change based on a result of the prediction.

In some embodiments, the input data comprises data reflecting: (i) upward or downward shifts in the storage capacity of the file system of the given storage system that occur over a given time period; and/or (ii) changes in the storage capacity of the file system of the given storage system that recur regularly over the course of multiple calendar years.

In some embodiments, predicting a change to the storage capacity of the file system of the given storage system based on at least a portion of the obtained input data further comprises utilizing one or more predictive analytics models configured to one or more of: (i) perform a seasonal and trend decomposition with locally estimated scatterplot smoothing; (ii) compute an auto-regressive integrated moving average; and (iii) perform linear regression.

In some embodiments, causing the storage capacity of the file system of the given storage system to change based on a result of the prediction further comprises causing an increase or a decrease of the storage capacity of the file system in an amount and at a time determined from a result of the prediction.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionalities for automatically managing file system capacity using predictive analytics for a storage system will now be described in greater detail with reference to FIGS. 4 and 5. Although described in the context of system 100, these platforms may also be used to implement at least portions of other information processing systems in other embodiments.

Figure 4:
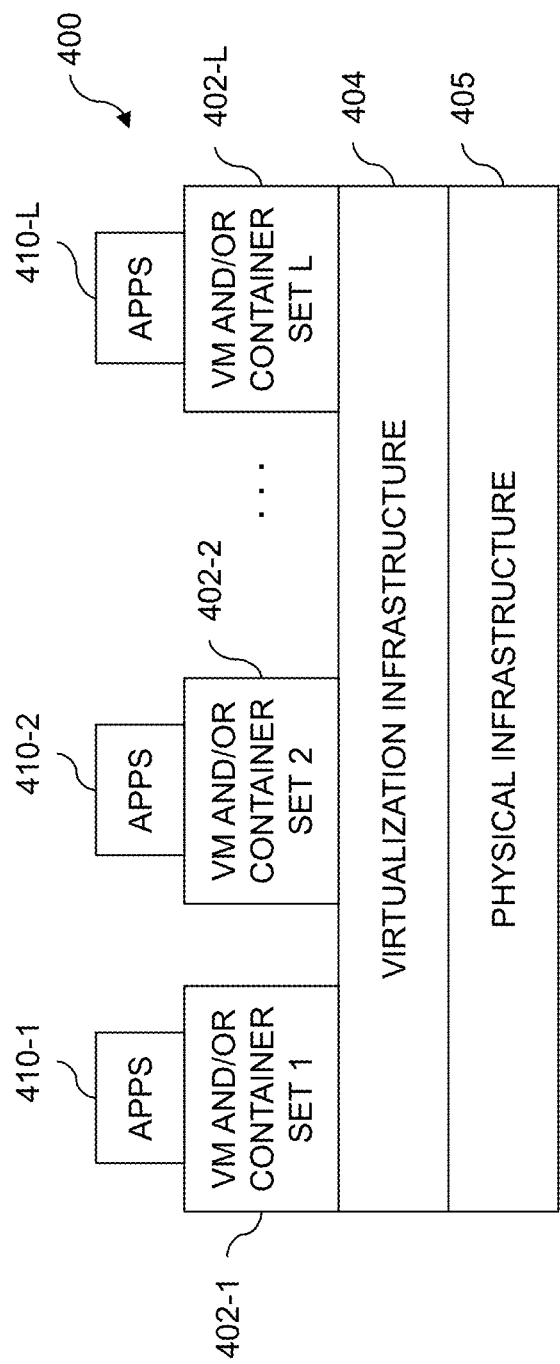
FIGS. 4 and 5 show examples of processing platforms that may be utilized to implement at least a portion of an information processing system in accordance with illustrative embodiments.
Figure 5:
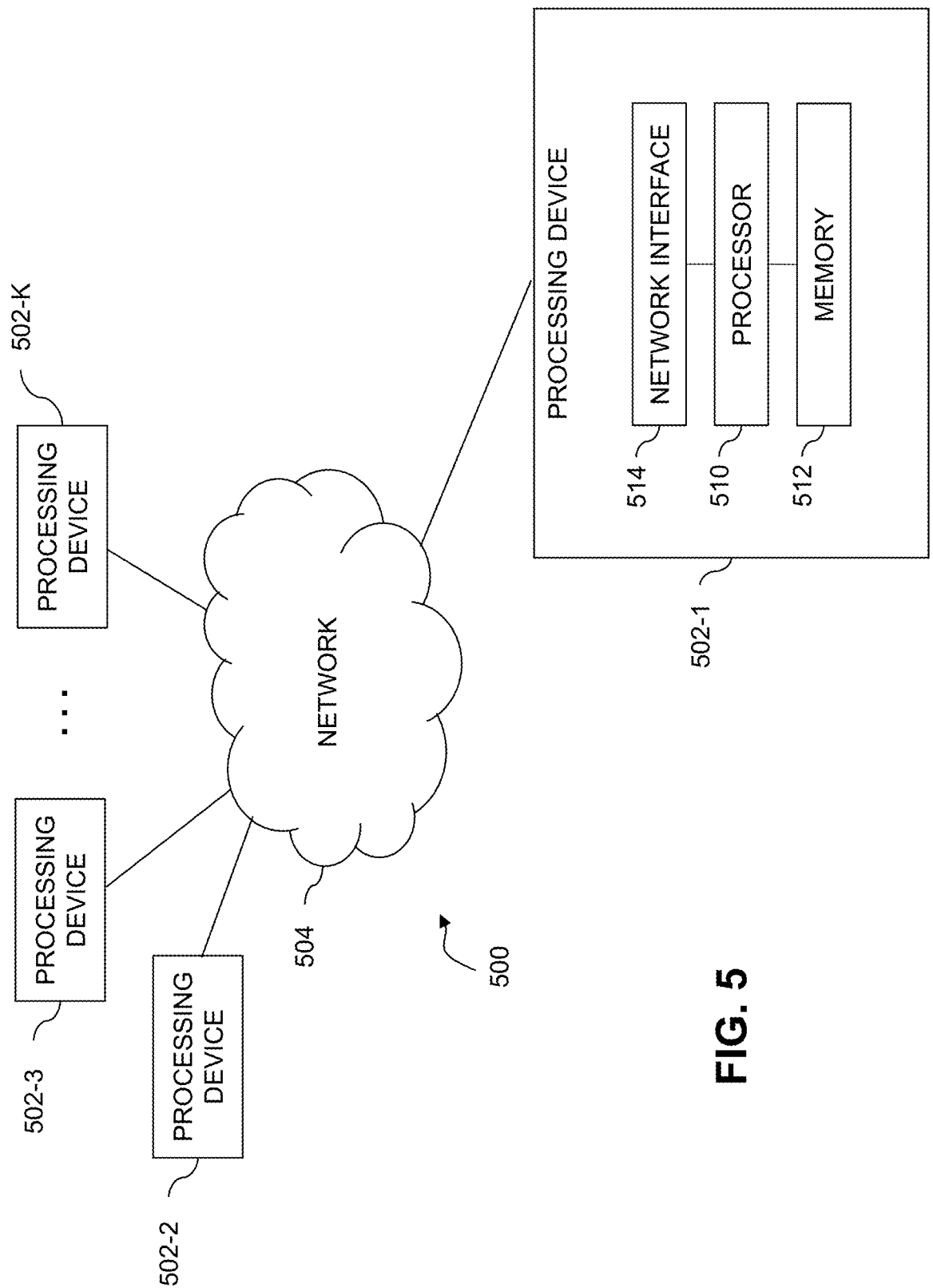

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionalities for managing file system capacity using predictive analytics for a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to:
      obtain input data representing information characterizing a storage capacity of a file system of a given storage system;
      predict a change to the storage capacity of the file system of the given storage system based on at least a portion of the obtained input data; and
      cause the storage capacity of the file system of the given storage system to change based on a result of the prediction;
   wherein causing the storage capacity of the file system of the given storage system to change further comprises causing with a file system management module associated with the given storage system one of an increase and a decrease of the storage capacity of the file system in an amount and at a future time instance as determined from the result of the prediction;
   wherein causing one of an increase and a decrease of the storage capacity of the file system comprises implementing one of an auto-extend functionality and an auto-contract functionality of the file system management module at the future time instance;
   wherein the given storage system comprises one or more storage arrays including one or more physical storage devices;
   wherein implementing one of an auto-extend functionality and an auto-contract functionality comprises the file system management module automatically initiating, in response to the result of the prediction, one of an allocation and a deallocation of storage space of the one or more physical storage devices to respectively accommodate the one of an increase and a decrease of the storage capacity of the file system;
   wherein the future time instance as determined from the result of the prediction is based on at least one of a history of the storage capacity of the file system and a seasonal recurrent change of the storage capacity of the file system; and
   wherein the file system management module is implemented by the one or more storage arrays of the given storage system.

2. The apparatus of claim 1, wherein the input data comprises data reflecting upward or downward shifts in the storage capacity of the file system of the given storage system that occur over a given time period.

3. The apparatus of claim 1, wherein the input data comprises data reflecting changes in the storage capacity of the file system of the given storage system that recur regularly over the course of multiple calendar years.

4. The apparatus of claim 1, wherein predicting a change to the storage capacity of the file system of the given storage system based on at least a portion of the obtained input data further comprises utilizing a predictive analytics model configured to perform a seasonal and trend decomposition with locally estimated scatterplot smoothing.

5. The apparatus of claim 1, wherein predicting a change to the storage capacity of the file system of the given storage system based on at least a portion of the obtained input data further comprises at least one of the following:
   utilizing a first predictive analytics model configured to compute an auto-regressive integrated moving average; and
   utilizing a second predictive analytics model configured to perform linear regression.

6. The apparatus of claim 1, wherein causing the storage capacity of the file system of the given storage system to change based on a result of the prediction further comprises automatically causing an increase of the storage capacity of the file system from a first physical storage size capacity to a second physical storage size capacity in an amount and at the future time instance as determined from the result of the prediction.

7. The apparatus of claim 1, wherein causing the storage capacity of the file system of the given storage system to change based on a result of the prediction further comprises automatically causing a decrease of the storage capacity of the file system from a first physical storage size capacity to a second physical storage size capacity in an amount and at the future time instance as determined from the result of the prediction.

8. A computer program product comprising a non-transitory processor-readable storage medium having stored therein program code of one or more software programs, wherein the program code when executed by at least one processing device causes the at least one processing device to perform steps of:
   obtaining input data representing information characterizing a storage capacity of a file system of a given storage system;
   predicting a change to the storage capacity of the file system of the given storage system based on at least a portion of the obtained input data; and
   cause the storage capacity of the file system of the given storage system to change based on a result of the prediction;
   wherein causing the storage capacity of the file system of the given storage system to change further comprises causing with a file system management module associated with the given storage system one of an increase and a decrease of the storage capacity of the file system in an amount and at a future time instance as determined from the result of the prediction;
   wherein causing one of an increase and a decrease of the storage capacity of the file system comprises implementing one of an auto-extend functionality and an auto-contract functionality of the file system management module at the future time instance;
   wherein the given storage system comprises one or more storage arrays including one or more physical storage devices;

wherein implementing one of an auto-extend functionality and an auto-contract functionality comprises the file system management module automatically initiating, in response to the result of the prediction, one of an allocation and a deallocation of storage space of the one or more physical storage devices to respectively accommodate the one of an increase and a decrease of the storage capacity of the file system;

wherein the future time instance as determined from the result of the prediction is based on at least one of a history of the storage capacity of the file system and a seasonal recurrent change of the storage capacity of the file system; and wherein the file system management module is implemented by the one or more storage arrays of the given storage system.

9. The computer program product of claim 8, wherein the input data comprises data reflecting upward or downward shifts in the storage capacity of the file system of the given storage system that occur over a given time period.

10. The computer program product of claim 8, wherein the input data comprises data reflecting changes in the storage capacity of the file system of the given storage system that recur regularly over the course of multiple calendar years.

11. The computer program product of claim 8, wherein predicting a change to the storage capacity of the file system of the given storage system based on at least a portion of the obtained input data further comprises utilizing a predictive analytics model configured to perform a seasonal and trend decomposition with locally estimated scatterplot smoothing.

12. The computer program product of claim 8, wherein predicting a change to the storage capacity of the file system of the given storage system based on at least a portion of the obtained input data further comprises at least one of the following:

utilizing a first predictive analytics model configured to compute an auto-regressive integrated moving average; and utilizing a second predictive analytics model configured to perform linear regression.

13. The computer program product of claim 8, wherein causing the storage capacity of the file system of the given storage system to change based on a result of the prediction further comprises automatically causing an increase of the storage capacity of the file system from a first physical storage size capacity to a second physical storage size capacity in an amount and at the future time instance as determined from the result of the prediction.

14. The computer program product of claim 8, wherein causing the storage capacity of the file system of the given storage system to change based on a result of the prediction further comprises automatically causing a decrease of the storage capacity of the file system from a first physical storage size capacity to a second physical storage size capacity in an amount and at the future time instance as determined from a result of the prediction.

15. A method comprising steps of:

obtaining input data representing information characterizing a storage capacity of a file system of a given storage system;

predicting a change to the storage capacity of the file system of the given storage system based on at least a portion of the obtained input data; and causing the storage capacity of the file system of the given storage system to change based on a result of the prediction;

wherein causing the storage capacity of the file system of the given storage system to change further comprises causing with a file system management module associated with the given storage system one of an increase and a decrease of the storage capacity of the file system in an amount and at a future time instance as determined from the result of the prediction;

wherein causing one of an increase and a decrease of the storage capacity of the file system comprises implementing one of an auto-extend functionality and an auto-contract functionality of the file system management module at the future time instance;

wherein the given storage system comprises one or more storage arrays including one or more physical storage devices;

wherein implementing one of an auto-extend functionality and an auto-contract functionality comprises the file system management module automatically initiating, in response to the result of the prediction, one of an allocation and a deallocation of storage space of the one or more physical storage devices to respectively accommodate the one of an increase and a decrease of the storage capacity of the file system;

wherein the method is performed by at least one processing device comprising a processor coupled to a memory;

wherein the future time instance as determined from the result of the prediction is based on at least one of a history of the storage capacity of the file system and a seasonal recurrent change of the storage capacity of the file system; and wherein the file system management module is implemented by the one or more storage arrays of the given storage system.

16. The method of claim 15, wherein causing the storage capacity of the file system of the given storage system to change based on a result of the prediction further comprises automatically causing an increase of the storage capacity of the file system from a first physical storage size capacity to a second physical storage size capacity in an amount and at the future time instance as determined from the result of the prediction.

17. The method of claim 15, wherein causing the storage capacity of the file system of the given storage system to change based on a result of the prediction further comprises automatically causing a decrease of the storage capacity of the file system from a first physical storage size capacity to a second physical storage size capacity in an amount and at the future time instance as determined from the result of the prediction.

* * * * *